United States Patent
Chen et al.

(10) Patent No.: US 11,676,049 B2
(45) Date of Patent: Jun. 13, 2023

(54) ENHANCED MODEL UPDATING USING VECTOR SPACE TRANSFORMATIONS FOR MODEL MAPPING

(71) Applicant: Oracle International Corporation, Redwood Shores, CA (US)

(72) Inventors: Guodong Chen, Austin, TX (US); Shekhar Agrawal, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 582 days.

(21) Appl. No.: 16/818,651

(22) Filed: Mar. 13, 2020

(65) Prior Publication Data

US 2021/0081817 A1 Mar. 18, 2021

Related U.S. Application Data

(60) Provisional application No. 62/900,359, filed on Sep. 13, 2019.

(51) Int. Cl.
*G06F 17/00* (2019.01)
*G06F 7/00* (2006.01)
*G06N 5/04* (2023.01)
*G06N 20/00* (2019.01)

(52) U.S. Cl.
CPC ............ *G06N 5/04* (2013.01); *G06N 20/00* (2019.01)

(58) Field of Classification Search
CPC ................................. G06N 5/04; G06N 20/00
USPC ........................................................ 706/12
See application file for complete search history.

(56) References Cited

U.S. PATENT DOCUMENTS

| | | | | |
|---|---|---|---|---|
| 2002/0168100 | A1* | 11/2002 | Woodall | G06T 7/0002 382/156 |
| 2003/0179911 | A1* | 9/2003 | Ho | G06V 40/162 382/173 |
| 2008/0147574 | A1* | 6/2008 | Chidlovskii | G06F 16/35 706/12 |
| 2010/0070440 | A1* | 3/2010 | Nguyen | G06N 20/00 706/12 |
| 2010/0169255 | A1* | 7/2010 | Fujieda | G06N 3/08 707/769 |
| 2015/0293900 | A1* | 10/2015 | Saadi | G06F 40/284 704/9 |
| 2016/0379092 | A1* | 12/2016 | Kutliroff | G06N 3/04 382/158 |
| 2017/0032279 | A1* | 2/2017 | Miserendino | G06N 20/00 |
| 2017/0144378 | A1* | 5/2017 | Giera | G06N 20/20 |
| 2020/0311262 | A1* | 10/2020 | Nguyen | H04L 63/1416 |

(Continued)

*Primary Examiner* — Pavan Mamillapalli
(74) *Attorney, Agent, or Firm* — Kilpatrick Townsend & Stockton LLP

(57) ABSTRACT

The present disclosure relates to systems and methods for updating static machine-learning models (e.g., a Doc2Vec model) without needing to retrain the models. More particularly, the present disclosure relates to systems and methods that can be used to add new data to a base model by training a client model using the new data, and transforming the vector space of the client model to align with the vector space of the base model. The base model can then be updated using the realigned client model. As such, the base model can be updated with the new data without needing to retrain the base model, which can be burdensome to processing resources, insecure, and time consuming.

20 Claims, 9 Drawing Sheets

(56) References Cited

U.S. PATENT DOCUMENTS

2020/0314117 A1* 10/2020 Nguyen .................. G06N 3/08
2021/0158182 A1* 5/2021 Duvvuri ................ G06F 16/258

* cited by examiner

| | Dimension A | Dimension B | Dimension C | ... | Dimension N |
|---|---|---|---|---|---|
| anchor word 1 | 0.68724 | 0.65024 | 0.51147 | ... | 0.32154 |
| anchor word 2 | 0.89654 | 0.41256 | 0.46784 | ... | 0.24741 |
| anchor word 3 | 0.14655 | 0.15452 | 0.31213 | ... | 0.54513 |
| anchor word 4 | 0.74511 | 0.54211 | 0.14124 | ... | 0.21471 |
| ... | | | | | |

| | Dimension T | Dimension W | Dimension C | ... | Dimension N |
|---|---|---|---|---|---|
| anchor word 1 | 0.54342 | 0.61231 | 0.45876 | ... | 0.46571 |
| anchor word 2 | 0.76874 | 0.57877 | 0.59875 | ... | 0.29648 |
| anchor word 3 | 0.23546 | 0.36447 | 0.47584 | ... | 0.14873 |
| anchor word 4 | 0.84682 | 0.24687 | 0.14762 | ... | 0.97136 |
| ... | | | | | |

ENHANCED MODEL UPDATING USING VECTOR SPACE TRANSFORMATIONS FOR MODEL MAPPING

CROSS-REFERENCE TO RELATED APPLICATIONS

This application claims the priority benefit of U.S. Provisional Application No. 62/900,359, filed on Sep. 13, 2019, the disclosure of which is hereby incorporated by reference in its entirety for all purposes.

TECHNICAL FIELD

The present disclosure relates to systems and methods for updating machine-learning models without re-training the models using new training data sets. More particularly, the present disclosure relates to systems and methods that can be used to add new data (e.g., tags or words) to a first machine-learning model (e.g., a base model) by training a second machine-learning model (e.g., a client model) using the new data, transforming the vector space of the second machine-learning model to align with the vector space of the first machine-learning model, and updating the first machine-learning model using the realigned second machine-learning model.

BACKGROUND

Machine-learning models can be executed to transform a set of documents into numerical representations. A raw model may provide numerical representations for each word and tag of a document, and the embeddings of the words and tags of the document can be aggregated to represent the document. The numerical representations of words and tags can be compared to determine relationships between the words and tags, and the aggregation of numerical representations of words and tags of two or more documents can be compared to determine the relationship between the documents. For example, the machine-learning models can be trained to learn numerical representations of words and tags using neural networks. However, these machine-learning models are often static. That is, after training a model using a set of documents and generating numerical vectors representing the set of documents, the trained model cannot be updated with new documents. Updating the trained model with new documents would involve retraining the model to incorporate the training data with the new documents (e.g., new training data). Additionally, depending on the source of the new documents, the new documents may be restricted from being incorporated into the original training data for privacy or security reasons. Thus, retraining a model with new training data may be impossible, or at the very least, can be burdensome on processing resources, insecure, and time consuming.

SUMMARY

Certain aspects and features of the present disclosure may relate to updating a trained machine-learning model with new training data without retraining the model. The trained model (referred to herein as a "base model") may be a static model trained at a first entity system (e.g., ORACLE) using a training data set (referred to herein as a "base training data set") collected from internal databases or external databases. As a non-limiting example, the base training data set may include the text data included in a set of documents. The first entity system may train the base model by inputting the base training data set into a document-to-vector model (e.g., Doc2Vec). Inputting the base training data set into the document-to-vector model may generate the base model, which may include a static numerical vector representation (e.g., an N-dimensional word vectors) of the base training data set.

Additionally, a client associated with the first entity system (e.g., a client of ORACLE) may collect client data, including another set of documents. While the client can execute the base model to generate predictions or recommendations using the client data, the base model may generate inaccurate predictions or recommendations when the client data is different from the base training data set. Thus, to enhance the accuracy of the base model with respect to the client data, certain embodiments described herein include updating the base model using the client data and without retraining the base model, so that the client can accurately generate predictions or recommendations using the base model.

Updating the base model using the client data may include generating a static trained machine-learning model (referred to herein as a "client model") by inputting the client data into a document-to-vector model. The client model may include a static numerical vector representation, such as N-dimensional word vectors, of the client data. N-dimensional word vectors may include an m*n matrix that represents a grid of numbers with m rows and n columns. M may represent the number of words and n may represent the number of features or dimensions of a word, so each word may be represented by an n-dimensional vector. The entire matrix may be N-dimensional vectors (e.g., "N-dimensional word vector" may represent n features of one word, and "N-dimensional words vector" may represent n features of some or all words in a set of documents). The N-dimensional word vectors included in the client model may have the same number of dimensions as the N-dimensional word vectors included in the base model (e.g., the number of dimensions can be configured in advance of training the base and client models). Each dimension of the N-dimensional word vectors of the client model corresponds to some or all words in the client data, and each word can be numerically represented by the N dimensions. However, the N-dimensional word vectors included in the client model may be represented in a vector space that is specific to the client model because the document-to-vector model uses a neural network (e.g., a block box of nodes and weights). As such, the base model and the client model are each represented in different vector spaces, but are structured similarly as N-dimensional matrices. Due to the different vector spaces between the base model and the client model, the first dimension of the N-dimensional word vectors of the base model, for example, may not represent the same feature as the first dimension of the N-dimensional word vectors of the client model.

To solve this technical challenge, certain embodiments of the present disclosure include rotating or transforming the N-dimensional word vectors of the client model into the vector space of the base model, so that both the base model and client model are aligned in the same scale and direction (e.g., in the same vector space). Once the N-dimensional word vectors of the client model has been rotated or transformed into the vector space of the base model, the values of each dimension of the N-dimensional word vectors of the client model can be used to update the values of the N-dimensional word vectors of the base model. The effect of updating the values of the base model with the values of the transformed client model is to update the base model with the client data represented by the client model, without retraining the base model.

In some implementations, the base model may be trained using a first set of documents (e.g., a first set of resumes and/or job descriptions), while the client model may be trained using a second set of documents collected by the client (e.g., a second set of resumes and/or job descriptions). The distributions of the word embeddings of the base model and the client model are in different vector spaces. Even the same words in the base model and the client model are represented by different vectors. Before the words embeddings of the client model can be used to update the words embeddings of the base model, the client model may be transformed or rotated into the vector space of the base model. The effect of rotating the client model into the vector space of the base model is that both the base model and the rotated client model are in the same scale and direction.

In some implementations, the client model may be rotated using a transformation mapping matrix. The transformation mapping matrix may be generated using the following steps: the overlap words between the base model and the client model may be extracted as anchor points; the words vectors may be normalized in both the rotated client and base models to avoid issues in ongoing incremental learning; the anchor points may be used to generate and train a linear transformation mapping matrix that can transform or rotate the client model to the vector space of the base model; and rotate the client model to the base model vector space using the mapping matrix. In some implementations, the transformation mapping matrix may be generated by solving a Procrustes problem using Linear Algebra. Since the rotated client model and the base model are normalized and rotated, the words vectors of each model are in the same scale and direction. New words in the rotated client model may be appended to the base model. For any overlap words between the rotated client model and the base model, a weighted average may be used to update the words vectors in the base model based on the frequency of the words in the first and second training data sets.

In some implementations, the process for rotating or transforming the vector space of the client model into the vector space of the base model may include the following: a first step of extracting the overlap words between the base model and the client model as anchor points (e.g., each dimension of the word vectors corresponds to all words in the set of documents); a second step of normalizing the word vectors in both models to avoid the exploding vector issues that can occur with ongoing incremental learning; a third step of using the anchor points to train a linear transformation mapping matrix that can be used to rotate the vector space of the client model to align with the vector space of the base model; a fourth step of rotating the vector space of the client model to be aligned with the vector space of the base model using the mapping matrix; and a fifth step of updating the values of each dimension of the base model with the values of the corresponding dimension of the transformed client model. Once the vector spaces of the client model and the base model are aligned, any new tags or words included in the client model can be identified and appended to the base model (e.g., appended as an N-dimensional vector to the N-dimensional words vectors, that is, the entire m*n matrix of words). For overlap words between the base model and the client model, the values of each dimension of the base model can be updated using the values of the corresponding dimension in the transformed client model. As a non-limiting example, the base model may be updated by using a weighted average to update the word vectors in the base model based on the frequency of the words in the two sets of documents (e.g., the set of documents compiled by the first entity system and the set of documents compiled by the client). A value or weight of a feature identified from the client model can be used to update the value or weight of a feature of the base model (e.g., a feature of the base model that is determined to correlate to the feature of the client model based on a detection of anchor point words), which increases the accuracy of any future recommendations outputted by the updated base model. The updated base model may generate accurate predictions or recommendations using the client data.

To illustrate and only as a non-limiting example, the base model can be used to generate recommendations of whether or not to hire particular candidates based on their resumes. In some implementations, a candidate's resume and a job description can be transformed into a vector representation (e.g., using the Doc2Vec algorithm) and compared against the base model to generate an output value that represents a hiring recommendation. For example, the base model may be used to transform resumes and job descriptions into N-dimensional word vectors. That is, the base training data set may include a set of resumes and a set of job descriptions. When a given job description is transformed into one or more N-dimensional word vectors, certain aspects and features of the present disclosure relate to calculating the cosine distance between the numerical representation of the job description and resumes using the word vectors. The output recommendation may be based on the distance (e.g., the resume with the shortest cosine distance to the job description may be considered a match for the job description).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: accessing a first trained model associated with a first entity, the first trained model having been trained using one or more training data sets, each training data set of the one or more training data sets representing a first set of documents, and the first trained model including n dimensions in a first vector space; accessing a second trained model associated with a second entity, the second trained model having been trained a second set of documents, and the second trained model including the n dimensions in a second vector space; determining a set of overlapping words between the first set of documents and the second set of documents; generating a rotation model using each of the first trained model and the second trained model, the rotation model being configured to transform the second trained model, such that the n dimensions in the second vector space are aligned with the n dimensions in the first vector space; transforming the second trained model using the rotation model, the transformed second trained model representing the n dimensions of the second trained model in the first vector space; and updating the first trained model using the transformed second trained model. Other embodiments of this aspect include corresponding computer systems, apparatus, and computer programs recorded on one or more non-transitory computer readable media, each configured to perform the actions of the methods.

Implementations may include one or more of the following features. The computer-implemented method where generating the rotation model further includes: generating a transpose of the first trained model; determining a product of the transpose of the first trained model and the second trained model; inputting the product into a third trained model; and generating an output in response to inputting the product into the third trained model, the output corresponding to the rotation model. The computer-implemented method where updating the first trained model further includes: transforming the second trained model by multiplying the rotation model with the second trained model, where transforming the second trained model realigns the n dimensions of the second trained model from the second vector space to the first vector space; and for each word of the set of overlapping words: combining a first value of each dimension of the n dimensions of the first trained model with a second value of the corresponding dimension of the n dimensions of the second trained model; and updating the first value with the combined first value and second value. The computer-implemented method where the first trained model is generated by inputting the first set of documents into a document-to-vector model, where the second trained model is generated by inputting the second set of documents into the document-to-vector model, and where the third trained model is a singular value decomposition (SVD) model. The computer-implemented method where each of the first trained model and the second trained model includes one or more n-dimensional word vectors. The computer-implemented method where the first trained model is updated with the second set of documents associated with the second entity without needing to retrain the first trained model. The computer-implemented method further including: inputting a particular resume into a document-to-vector model. The computer-implemented method may also include generating a vector representation of the particular resume. The computer-implemented method may also include inputting the vector representation of the particular resume into the updated first trained model. The computer-implemented method may also include generating one or more outputs of the updated first trained model, where each output of the one or more outputs is used to determine a recommendation of whether or not to hire a candidate associated with the particular resume. Implementations of the described techniques may include hardware, a method or process, or computer software on a computer-accessible medium.

One general aspect includes a system, including: one or more processors; and a non-transitory computer-readable storage medium containing instructions which, when executed on the one or more processors, cause the one or more processors to perform operations including: accessing a first trained model associated with a first entity, the first trained model having been trained using one or more training data sets, each training data set of the one or more training data sets representing a first set of documents, and the first trained model including n dimensions in a first vector space. The system also includes accessing a second trained model associated with a second entity, the second trained model having been trained a second set of documents, and the second trained model including the n dimensions in a second vector space. The system also includes determining a set of overlapping words between the first set of documents and the second set of documents. The system also includes generating a rotation model using each of the first trained model and the second trained model, the rotation model being configured to transform the second trained model, such that the n dimensions in the second vector space are aligned with the n dimensions in the first vector space. The system also includes transforming the second trained model using the rotation model, the transformed second trained model representing the n dimensions of the second trained model in the first vector space. The system also includes updating the first trained model using the transformed second trained model. Other embodiments of this aspect include corresponding computer systems, apparatus, and computer programs recorded on one or more computer storage devices, each configured to perform the actions of the methods.

Implementations may include one or more of the following features. The system where the operation of generating the rotation model further includes: generating a transpose of the first trained model; determining a product of the transpose of the first trained model and the second trained model; inputting the product into a third trained model; and generating an output in response to inputting the product into the third trained model, the output corresponding to the rotation model. The system where the operation of updating the first trained model further includes: transforming the second trained model by multiplying the rotation model with the second trained model, where transforming the second trained model realigns the n dimensions of the second trained model from the second vector space to the first vector space; and for each word of the set of overlapping words: combining a first value of each dimension of the n dimensions of the first trained model with a second value of the corresponding dimension of the n dimensions of the second trained model; and updating the first value with the combined first value and second value. The system where the first trained model is generated by inputting the first set of documents into a document-to-vector model, where the second trained model is generated by inputting the second set of documents into the document-to-vector model, and where the third trained model is a singular value decomposition (SVD) model. The system where each of the first trained model and the second trained model includes one or more n-dimensional word vectors. The system where the first trained model is updated with the second set of documents associated with the second entity without needing to retrain the first trained model. The system where the operations further include: inputting a particular resume into a document-to-vector model. The system may also include generating a vector representation of the particular resume. The system may also include inputting the vector representation of the particular resume into the updated first trained model. The system may also include generating one or more outputs of the updated first trained model, where each output of the one or more outputs is used to determine a recommendation of whether or not to hire a candidate associated with the particular resume. Implementations of the described techniques may include hardware, a method or process, or computer software on a computer-accessible medium.

One general aspect includes a computer-program product tangibly embodied in a non-transitory machine-readable storage medium, including instructions configured to cause a processor to perform operations including: accessing a first trained model associated with a first entity, the first trained model having been trained using one or more training data sets, each training data set of the one or more training data sets representing a first set of documents, and the first trained model including n dimensions in a first vector space; accessing a second trained model associated with a second entity, the second trained model having been trained a second set of documents, and the second trained model including the n dimensions in a second vector space; determining a set of overlapping words between the first set of documents and the second set of documents; generating a rotation model using each of the first trained model and the second trained model, the rotation model being configured to transform the second trained model, such that the n dimensions in the second vector space are aligned with the n dimensions in the first vector space; transforming the second trained model using the rotation model, the transformed second trained model representing the n dimensions of the second trained model in the first vector space. The computer-program product also includes updating the first trained model using the transformed second trained model. Other embodiments of this aspect include corresponding computer systems, apparatus, and computer programs recorded on one or more computer storage devices, each configured to perform the actions of the methods.

Implementations may include one or more of the following features. The non-transitory machine-readable storage medium where the operation of generating the rotation model further includes: generating a transpose of the first trained model; determining a product of the transpose of the first trained model and the second trained model; inputting the product into a third trained model; and generating an output in response to inputting the product into the third trained model, the output corresponding to the rotation model. The non-transitory machine-readable storage medium where the operation of updating the first trained model further includes: transforming the second trained model by multiplying the rotation model with the second trained model, where transforming the second trained model realigns the n dimensions of the second trained model from the second vector space to the first vector space; and for each word of the set of overlapping words: combining a first value of each dimension of the n dimensions of the first trained model with a second value of the corresponding dimension of the n dimensions of the second trained model; and updating the first value with the combined first value and second value. The non-transitory machine-readable storage medium where the first trained model is generated by inputting the first set of documents into a document-to-vector model, where the second trained model is generated by inputting the second set of documents into the document-to-vector model, and where the third trained model is a singular value decomposition (SVD) model. The non-transitory machine-readable storage medium where the first trained model is updated with the second set of documents associated with the second entity without needing to retrain the first trained model. The non-transitory machine-readable storage medium where the operations further include: inputting a particular resume into a document-to-vector model. The non-transitory machine-readable storage medium may also include generating a vector representation of the particular resume. The non-transitory machine-readable storage medium may also include inputting the vector representation of the particular resume into the updated first trained model. The non-transitory machine-readable storage medium may also include generating one or more outputs of the updated first trained model, where each output of the one or more outputs is used to determine a recommendation of whether or not to hire a candidate associated with the particular resume. Implementations of the described techniques may include hardware, a method or process, or computer software on a computer-accessible medium.

Additionally, the disclosures of each of the following patent applications: (1) U.S. Ser. No. 16/007,787, filed Jun. 13, 2018; (2) U.S. Ser. No. 16/146,678, filed Jun. 13, 2018; (3) U.S. Ser. No. 16/007,762, filed Jun. 13, 2018; and (4) U.S. Ser. No. 16/007,677, filed Jun. 13, 2018, are incorporated by reference herein for all purposes.

Advantageously, according to certain embodiments, updating the tags or words of a static trained model can be achieved without retraining the trained model. Certain aspects and features of the present disclosure described herein can also improve the privacy or security of the original training data (e.g., the base training data set) and the new training data (e.g., the client data) because the base model and the client model cannot be used to identify any individual users or sentences from the documents. Thus, updating the base model with the client data can be achieved while maintaining the privacy or anonymity of the users' data underlying the models. For example, when a document-to-vector algorithm is used to transform a set of documents into N-dimensional word vectors, the resulting model may include N-dimensional word vectors, which comprise at least one vector of numerical values that numerically represents the set of documents. Thus, even if the information contained in the set of documents includes sensitive information, once the document-to-vector algorithm transforms the set of documents into vector representations using a neural network, the resulting N-dimensional word vectors can no longer be used to regenerate the information included in the set of documents. The document-to-vector algorithm uses a neural network to process the set of documents, and thus, the N-dimensional word vectors are created based on the nodes and weights calculated as part of the neural network. Due to the complexities and the black-box nature of neural networks, the N-dimensional word vectors cannot be reverse-engineered to regenerate the original set of documents. Thus, the embodiments described herein can enhance the data security and privacy of processing documents because sensitive information contained in a first set of documents can be numerically represented by models, and importantly, can be added to other sensitive data contained in a second set of documents (e.g., the client data), while maintaining the privacy and anonymity of the information contained in the individual sets of documents.

As an illustrative example, if the base training data used to train the base model contains sensitive information, and if the client data used to train the client model also includes different sensitive data, the client data itself cannot be added to the base training data to train a model because combining the sensitive training data and the sensitive client data may violate privacy laws or the confidentiality obligations of certain parties. However, according to certain embodiments of the present disclosure, training a model using the base training data (e.g., the base model) results in N-dimensional word vectors that no longer contain any comprehendible sensitive information (but nonetheless still numerically represent each word of the sensitive information in the training data). Similarly, training a model using the client data (e.g., the client model) results in N-dimensional word vectors that no longer contain any comprehendible sensitive information (but nonetheless still numerically represent each word of the sensitive information in the client data).

Further, certain embodiments can be performed to rotate or otherwise transform the N-dimensional word vectors that represent the client model to the vector space of the base model, so that the client data can be used, in effect, to update the base training data without needing to add the client data to the base training data and retrain the base model, and without violating any privacy laws or confidentiality obligations. The numerical representation of the sensitive information included in the client data may no longer be comprehendible as sensitive information once in the form of the N-dimensional word vectors, and this representation of the client data can be used to update the numerical representation of the sensitive information included in the training data once in the form of the N-dimensional vectors. Thus, the embodiments described herein advantageously can be used to enhance privacy, data security, and computational efficiency.

Additionally, the training data of the base model can be updated without needing to retrain the base model, which provides a significant technical advantage and improvement in computational efficiency. As a non-limiting and illustrative example, retraining a model on a large set of documents can take 5 days, however, certain embodiments described herein may enable the base model to be updated within 24 hours without retraining the base model.

BRIEF DESCRIPTION OF THE DRAWINGS

The specification makes reference to the following appended figures, in which use of like reference numerals in different figures is intended to illustrate like or analogous components.

FIGS. 6A-6B are examples of a portion of an N-dimensional words vector included in a base model and a portion of an N-dimensional words vector included in a client model, according to some aspects of the present disclosure.

DETAILED DESCRIPTION

Figure 1:
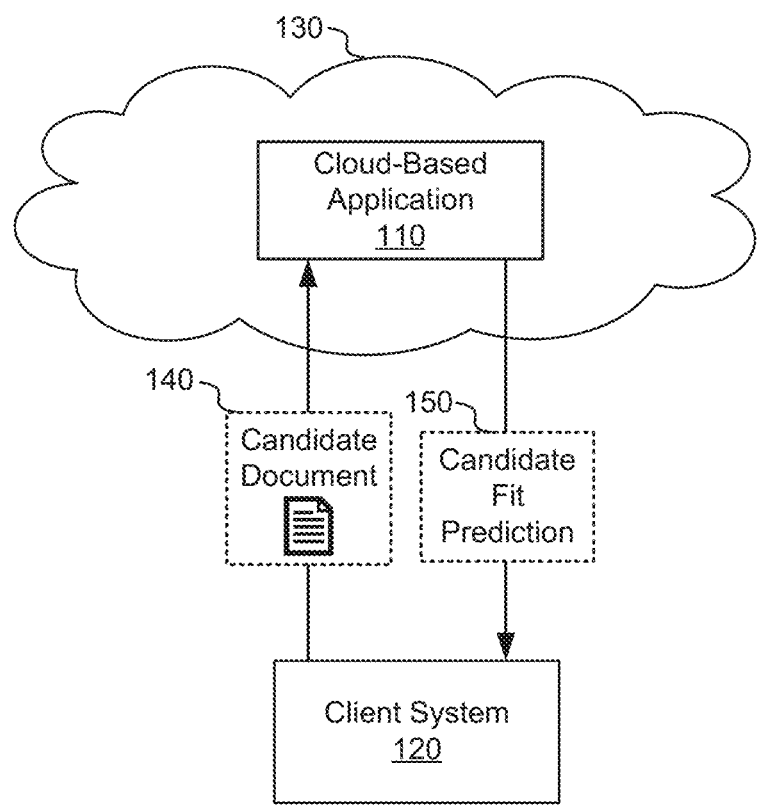
FIG. 1 is a block diagram illustrating an example network environment, according to some aspects of the present disclosure.

FIG. 1 is a block diagram illustrating an example of network environment 100, according to some aspects of the present disclosure. In some implementations, network environment 100 may include cloud network 130. Cloud network 130 may be any public or private network of servers and databases. Cloud network 130 may include cloud-based application 110. Cloud-based application 110 can be any application configured to perform one or more functions. For example, cloud-based application 110 may be a data management application configured to provide certain functionality to client system 120. To illustrate and only as a non-limiting example, cloud-based application 110 may perform a function of generating predictions or recommendations of an extent to which a candidate fits or matches a job description. Cloud network 130 or cloud-based application 110 may include a data store that stores the base model, client model, the transformed client model, and/or the updated base model.

Client system 120 may be any network of servers and databases associated with a client. For example, a client may be an entity that has registered with cloud-based application 110 to receive predictions or recommendations of candidate fitness for a job description. Continuing with the non-limiting example above, client system 120 may transmit a candidate document 140 (e.g., a candidate's resume or other documents associated with the candidate's application for the job description) to cloud-based application 110. Client system 120 may also transmit text representing a job description to cloud-based application 110 or the cloud-based application 110 may have access to the text representing the job description. Cloud-based application 110 may extract the text data from candidate document 140 and input the text data into a document-to-vector algorithm. The document-to-vector algorithm may generate an N-dimensional word vectors for each word included in the candidate document 140. Cloud-based application 110 may input the N-dimensional word vectors representing the candidate document 140 into a base model stored at cloud network 130 or cloud-based application 110 to generate a candidate fit prediction 150. The candidate fit prediction 150 may be a value that represents an extent to which the candidate document 140 matches the job description. Whether or not the candidate matches the job description may, for example, be based on a cosine distance between the numerical representation of the candidate document 140 and the numerical representation of the job description.

It will be appreciated that the cloud-based application 110 of the present disclosure is not limited to performing the functionality of generating predictions or recommendations of candidate fitness for a job description. Cloud-based application 110 can perform any functionality involving transforming a document or a set of documents into an N-dimensional words vector and generating predictions or recommendations using machine-learning techniques. The set of documents may include any documents, and thus, is not limited to resumes or job descriptions. It will also be appreciated that cloud-based application 110 may perform any word embeddings model to transform a word or set of words into a vector representation.

Figure 2:
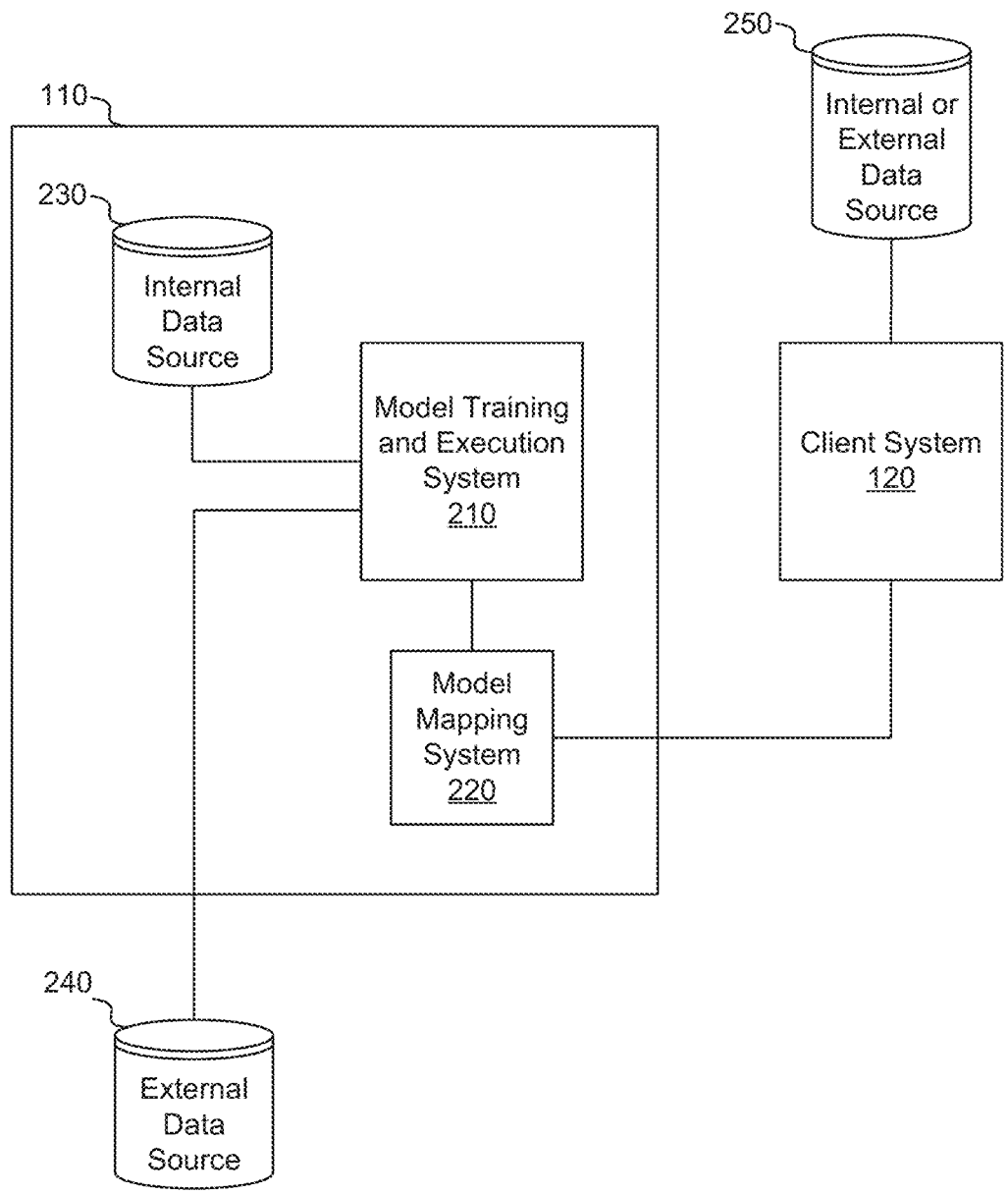
FIG. 2 is a block diagram illustrating another example network environment, according to some aspects of the present disclosure.

FIG. 2 is a block diagram illustrating an example of a network environment including network environment 200. Network environment 200 may include cloud-based application 110 and client system 120, similar to FIG. 1. Cloud-based application 110 may include model training and execution system 210. Model training and execution system 210 may be operated by an entity, such as ORACLE. Further, model training and execution system 210 may be configured to train and execute machine-learning models. For example, model training and execution system 210 may retrieve a set of documents from internal data source 230 and/or external data source 240. For example, the set of documents may include any text. Internal data source 230 may be, as a non-limiting example, the TALEO database accessible to ORACLE, and which may not be publicly accessible. External data source 240 may be, as a non-limiting example, the ESCO and O*Net public databases that store hiring data (e.g., public domain taxonomies of jobs). It will be appreciated that internal data source 230 and external data source 240 may be databases that store any set of documents.

Model training and execution system 210 may retrieve the set of documents (e.g., the base training data set) from internal data source 230 and/or external data source 240. The set of documents may include any number of different words. Further, model training and execution system 210 may input the set of documents into a document-to-vector algorithm, such a Doc2Vec, to generate word embeddings for each word sequence in the set of documents. The result of inputting the set of documents into the document-to-vector algorithm may generate a static numerical N-dimensional words vector representing the words within the set of documents. Each dimension of the N-dimensional word vectors may represent an aspect of a word, such as a mathematical combination of each word in the set of documents. Further, each dimension of the N-dimensional word vectors may represent a feature of the set of documents. For example, a feature may be extracted using a neural network using contextual information to represent each word. The features may not be known as the neural network may be considered a black box. However, a weight may be generated for each feature as a result of executing the document-to-vector algorithm. Thus, the N-dimensional words vector outputted after inputting the set of documents into the document-to-vector algorithm may represent the base model, which is stored at model training and execution system 210.

To illustrate and only as a non-limiting example, a document may be inputted into the document-to-vector model to output a vectorized representation of the document (e.g., the words of the document transformed into a numerical vector representation using a document-to-vector algorithm). The vectorized representation of the document may be inputted into the base model to generate a recommendation as to whether the candidate associated with the document should be hired or whether or to what extent the candidate matches a description. The values of the vectorized document can be compared against the values included in the N-dimensional word vectors using machine-learning techniques to determine the recommendation of one or more candidates.

Client system 120 may be operated by a client of the entity that operates the model training and execution system 210. That is, the client and the entity may be independent entities, however, the client may seek to use the base model trained by the entity to assist in making hiring recommendation for the client. To make the base model contextual to the hiring needs and the industry of the client, model mapping system 220 may be used to update the base model without retraining the base model, according to certain embodiments. Client system 120 may communicate with internal or external data source 250, which stores a set of documents (e.g., the client data), for example, including at least text data representing the resumes that the client has received in the past and the job descriptions for the jobs that the client has created in the past. The internal or external data source 250 is independent and potentially not accessible to the entity. That is, the entity may be prohibited from accessing the set of documents stored at internal or external data source 250 for security or privacy reasons. Thus, an additional technical advantage of the embodiments and implementations described herein, is that the base model (which cannot be used to individually identify any user) can be updated with new source data, while maintaining the privacy and anonymity of the individuals represented by the source data.

Model mapping system 220 may include one or more servers configured to execute code that, when executed, causes the base model to be updated with the client data stored at internal or external data source 250. For example, model mapping system 220 may train a new model (e.g., the client model) by inputting the client data stored at data source 250 into a document-to-vector algorithm (e.g., the Doc2Vec algorithm). The output of the document-to-vector algorithm may be the client model, which includes an N-dimensional representation of the client data stored at data source 250. Now, with the client model trained, model mapping system 220 can extract the overlap words between the base model and the client model. That is, since each dimension of the N-dimensional word vectors included in the client model numerically represents all words in the client data, and since each dimension of the N-dimensional word vectors included in the base model numerically represents all words in the base training data set, model mapping system 220 may identify any words that overlap between the client model and the base model to identify anchor points. An anchor point may be a word that is shared between the client model and the base model, and thus, can be used to rotate or transform the client model into the vector space of the base model. The model mapping system 220 can normalize the values of the vectors included in the N-dimensional words vectors in both the client model and the base model (e.g., to ensure that values are not constantly getting larger). Thus normalizing the words vectors in the base and client models may avoid the exploding vector issue that can occur during ongoing incremental learning (e.g., online learning). Model mapping system 220 may use the identified anchor points (e.g., the overlapping words between the base model and the client model) to train a linear transformation mapping matrix W, which can rotate the vector space of the client model to the vector space of the base model using, for example, the same process as solving a Procrustes problem in Linear Algebra. The linear transformation mapping matrix W may be a rotation function that rotates a vector into a different vector space, in the case, the vector space of the base model. Model mapping system 220 can then apply the transformation mapping matrix W to the N-dimensional word vectors of the client model to generate a new client model, which is rotated to the vector space of the base model. Model mapping system 220 can then update the N-dimensional word vectors of the base model using the new client model because the new client model has the same scale and direction as the base model. Since the base model and the new client model are normalized and rotated, the words vectors are in the same scale and direction, and thus, for all new words included in the new client model, the model mapping system 220 may append those new words to the N-dimensional word vectors of the base model. For all words that overlap between the client model and the base model, the model mapping system 220 may use a weighted average to update the words vectors in the base model based on the frequency of the words in the base training data set and the client data.

Figure 3:
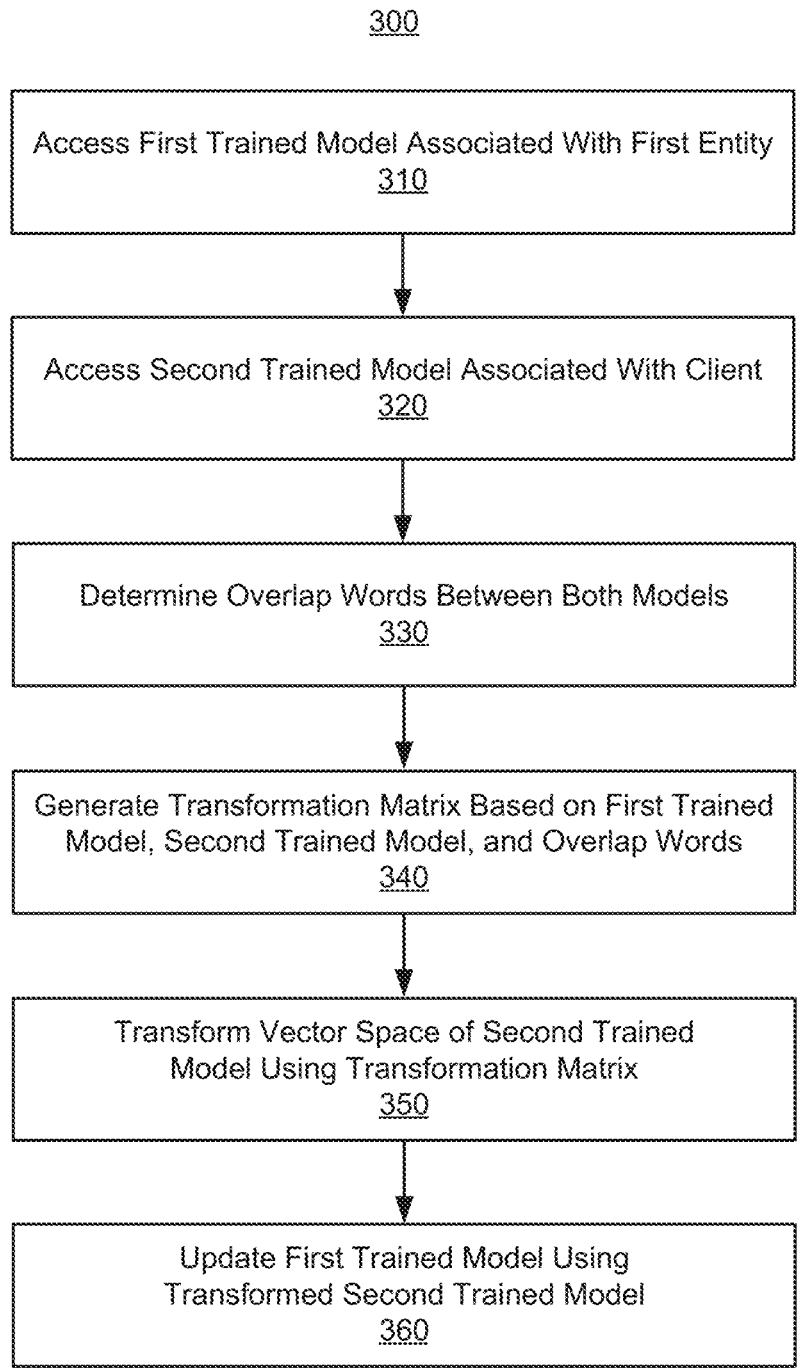
FIG. 3 is a flowchart illustrating an example of a process for updating a trained model without rotating the model, according to some aspects of the present disclosure.

FIG. 3 is a flowchart illustrating an example of a process for updating a trained model without rotating the model, according to some aspects. Process 300 may be performed at least in part by any component described in the present disclosure. For example, process 300 may be performed at least in part by the model mapping system 220 illustrated in FIG. 2.

Process 300 may begin at block 310 where a first trained model associated with a first entity (e.g., ORACLE) may be accessed, for example, by model mapping system 220 or model training and execution system 210. The first trained model may be the base model described herein. The first trained model may have been trained using one or more training data sets accessed by the first entity (e.g., the internal Taleo database and/or public databases, such as ESCO and O*Net). The one or more training data sets may be retrieved from internal data source 230 and/or external data source 240. Each training data set of the one or more training data sets may represent any text data, such as resume data (e.g., a first set of resumes obtained by ORACLE) and/or job description data (e.g., a first set of job descriptions obtained by ORACLE). The first trained model may use or include a first N-dimensional word vectors of a first vector space, in which a first set of documents are numerically represented. The first set of documents may be included in the one or more training data sets. Each dimension of the first N-dimensional word vectors may numerically represent all of the words included in the first set of documents. It will be appreciated that the training data set may include any information that can be represented by a vector representation (e.g., a two-dimensional matrix). For example, the training data set may include a plurality of graphs, which can be transformed into a vector representation using a graph-to-vector algorithm (e.g., Graph2Vec).

At block 320, model mapping system 220 may access a second trained model (e.g., also a Doc2Vec words vector) associated with a client (e.g., a customer of ORACLE). The client may be independent from the entity, such as ORACLE. The second trained model may have been trained using source data accessed by the client (e.g., the resumes and job descriptions obtained by the client). For example, the source data may be stored at internal or external data source 250. The internal or external data source 250 may not be accessible to the entity, but may be accessible to the client. Thus, updating the base model with the source data stored at internal or external data source 250 provides the technical advantage of updating the base model, while maintaining the privacy and anonymity of the individual users represented by the source data. For example, the source data may represent resume data (e.g., a second set of resumes obtained by the client) and/or job description data (e.g., a second set of job descriptions obtained or created by the client). The second trained model may use or include a second N-dimensional word vectors of a second vector space in which a second set of documents are numerically represented. Each dimension of the second N-dimensional word vectors may corresponding to all words included in the second set of documents.

At block 330, the model mapping system 220 may determine, for each of one or more dimensions of the first N-dimensional word vectors, a set of overlapping words between the base model and the client model (e.g., detecting that the words associated with feature A of Oracle's Doc2Vec word vectors is the same as one or more words associated with feature B of the client's Doc2Vec word vectors, indicating that feature A of Oracle's Doc2Vec word vectors is the same as feature B of the client's Doc2Vec word vectors). The overlapping words may be the words that appear in both the base model and the client model. Further, each dimension of the N-dimensional word vectors of the base model may include or correspond to a mathematical combination of all dimensions of the N-dimensional word vectors included in the client model. Each overlap word may be an anchor point that is later used to rotate the vector space of the client model to the vector space of the base model.

At block 340, the model mapping system 220 may generate a transformation mapping matrix using each of the first trained model, the second trained model, and the set of overlap word between the two models. The transformation mapping matrix may be configured to transform the second trained model, such that the second vector space is aligned with the first vector space (e.g., rotating the second trained model to match the scale and direction of the first trained model). In some implementations, the anchor points (e.g., the overlapping words) may be used to train the transformation mapping matrix using the same process as solving a Procrustes problem in Linear Algebra.

At block 350, the model mapping system 220 may transform the second trained model using the transformation mapping matrix. The transformed second trained model may represent the second N-dimensional word vectors in the first vector space, in which the base model is represented.

At block 360, the model mapping system 220 may update the first trained model using the transformed second trained model (e.g., the rotated client model). For new words that are included in the client model, but not the base model, the new words may be appended to the base model. For the overlap words that appear in both the base model and the rotated client model, a weighted average of the word vectors in the base model and the rotated client model can be calculated to update the first trained model.

Figure 4:
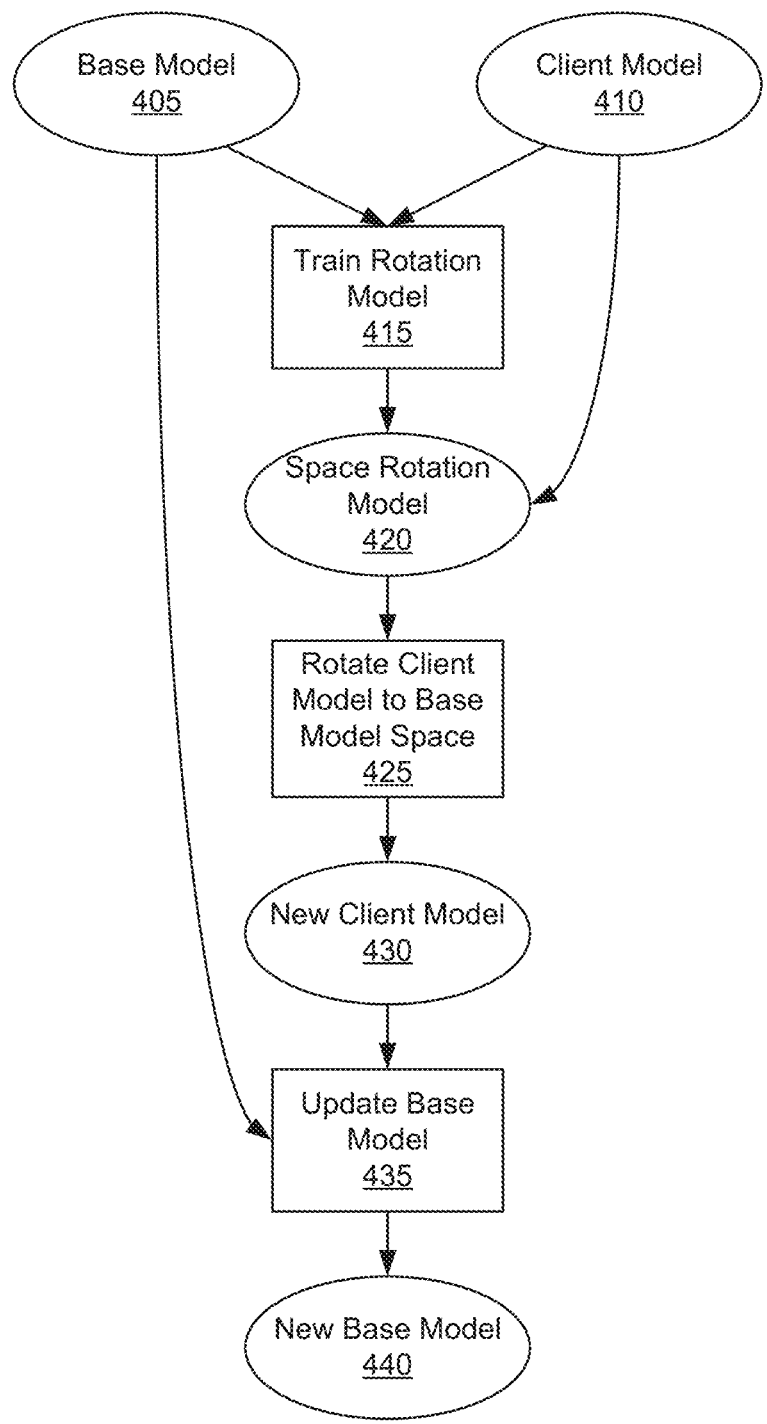
FIG. 4 is a flowchart illustrating an example of a process for rotating the client model to be aligned with the base model, according to some aspects of the present disclosure.

FIG. 4 is a flowchart illustrating an example of a process 400 for rotating the client model to be aligned with the base model, according to some aspects of the present disclosure. Process 400 may be a process for updating the base model by rotating the vector space of the client model to the vector space of the base model. Process 400 may be performed at least in part by the model mapping system 220 shown in FIG. 2, although, any part or all parts of process 400 may be performed by other components, as well, such as the model training and execution system 210 or the client system 120 of FIG. 2.

Process 400 may include base model 405 and client model 410. For example, cloud-based application 110 may generate each of base model 405 or client model 410 by inputting a set of documents (e.g., resumes or job descriptions) into a document-to-vector model to generate an N-dimensional words vector representing the set of documents. At step 415, the cloud-based application 110 may use the base model 405 and the client model 410 to train a rotation model (e.g., a transformation mapping matrix). For example, the cloud-based application 110 may perform a singular value decomposition (SVD) using the transpose of the base model and the client model. At step 420, the rotation model may be the result of training, the rotation model at step 415. At block 425, the cloud-based application 110 may rotate the vector space of the client model to the vector space of the base model by multiplying (e.g., taking the product of) the rotation model with the client model 410. The result of rotating the client base model is a new client model 430. The new client model 430 may include N-dimensional word vectors that are in the same vector space as the N dimensions of the base model 405. At step 435, the cloud-based application 110 may update the base model 405. For example, the base model 405 may be updated using the vector values included in the rotated client model 430. The new base model 440 may be the result of combining a vector value of a dimension of the base model 405 with the vector value of the corresponding dimension of the rotated client model 430.

Figure 5A:
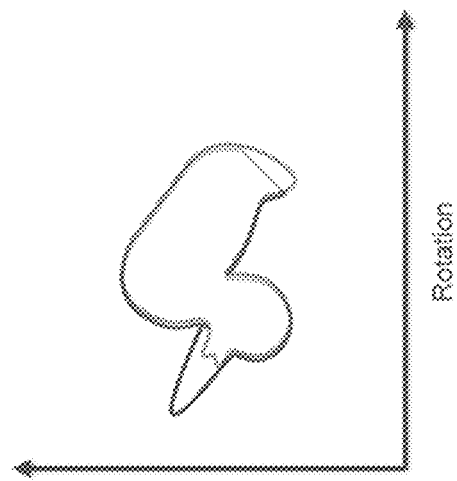
FIGS. 5A-5C are examples of rotating a vector space, according to some aspects of the present disclosure.
Figure 5B:
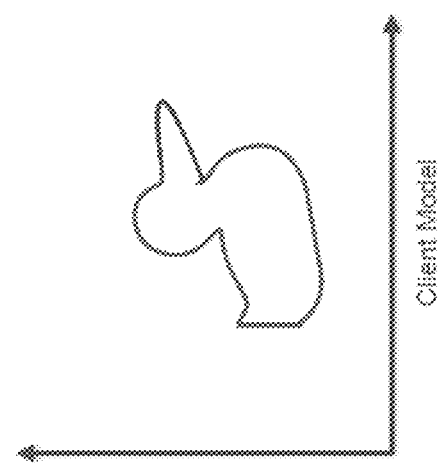
Figure 5C:
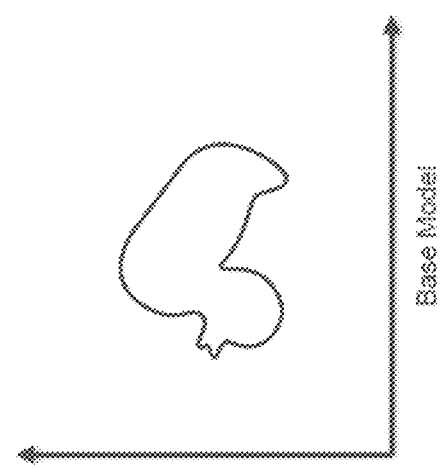

FIGS. 5A-5C are examples of rotating a vector space, according to some aspects of the present disclosure. FIG. 5A shows an example illustration representing the vector space 500A of the base model. FIG. 5B shows an example illustration representing the vector space 500B of the client model. Lastly, FIG. 5C shows an example illustration representing the vector space 500C of the client model rotated to the same scale and direction as the base model. The overlapping portions of the base model and the client model may represent the overlapping words used as anchor points for the transformation matrix. The overlap may be a subset of the set of words associated with the base or client model. The transformation matrix (not shown) may be applied to the vector space of the client model to rotate the client model to the vector space of the base model. Further, the portions of vector space 500C that do not overlap may represent new words included in the client model that are not included in base model.

FIG. 6A shows an example of a portion of an N-dimensional words vector 600A of a base model numerically representing word embeddings of anchor points. The leftmost column in words vector 600A may represent rows of anchor points or overlapping words between the client model and the base model. Each dimension of the dimensions shown in words vector 600A may correspond to all of the words in a set of documents. Similarly, words vector 600B of FIG. 6B may represent an example of a portion of an N-dimensional words vector of a client model. At least words vectors 600A and 600B may be used to generate the linear transformation mapping matrix, which can rotate the vector space of the client model.

Figure 7:
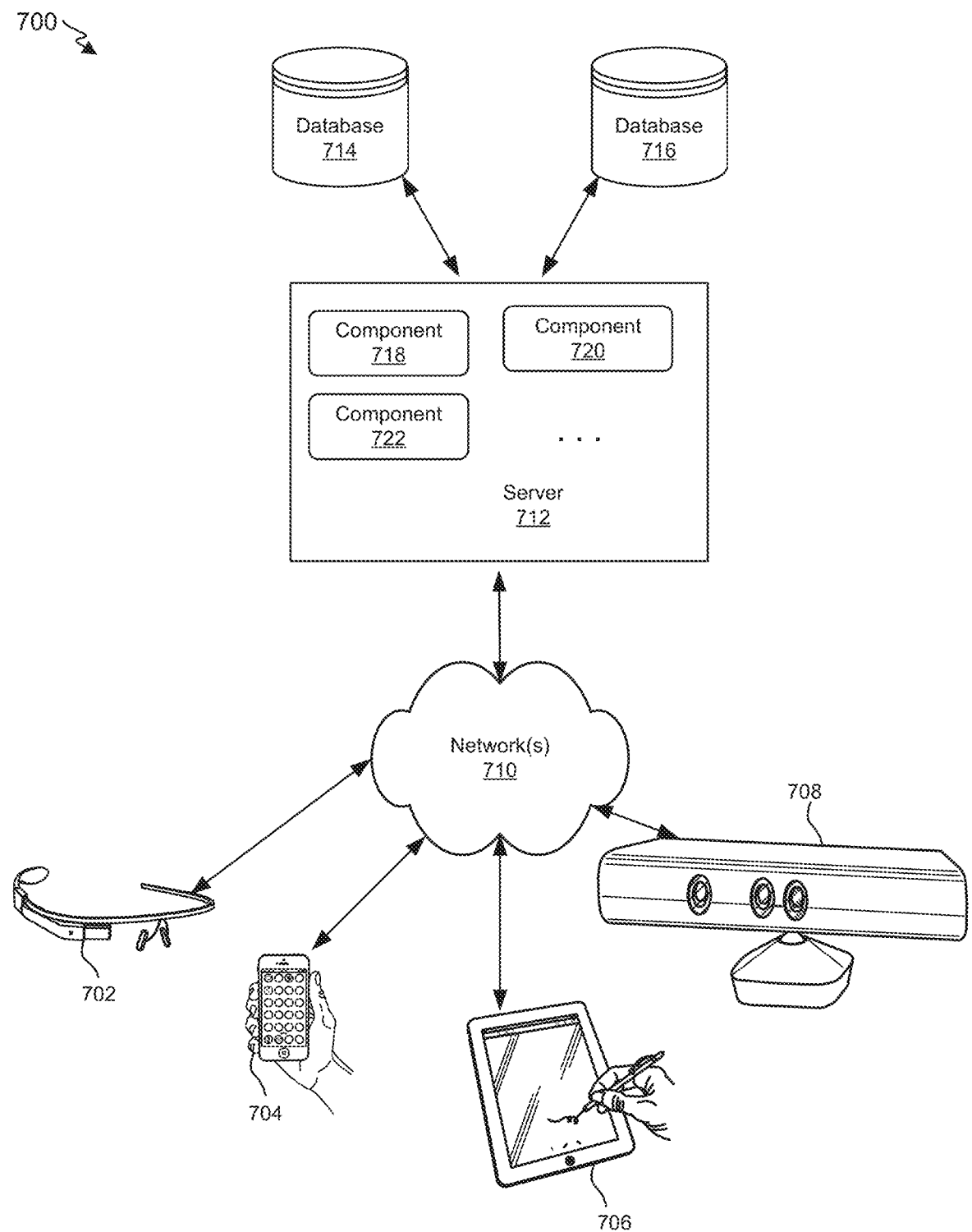
FIG. 7 is a simplified diagram illustrating a distributed system for implementing one of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
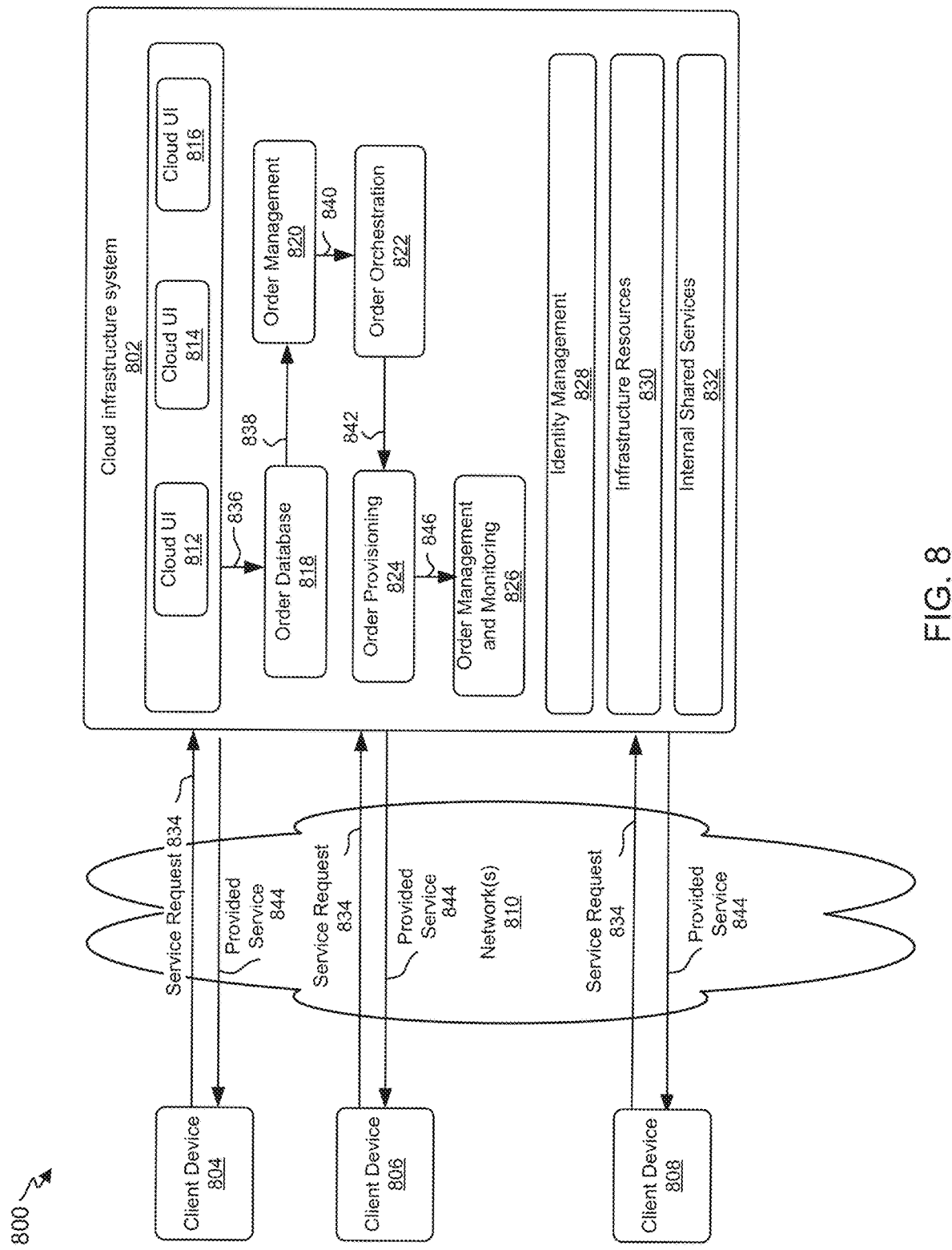
FIG. 8 is a simplified block diagram illustrating one or more components of a system environment.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of processes associated with each order and applies logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
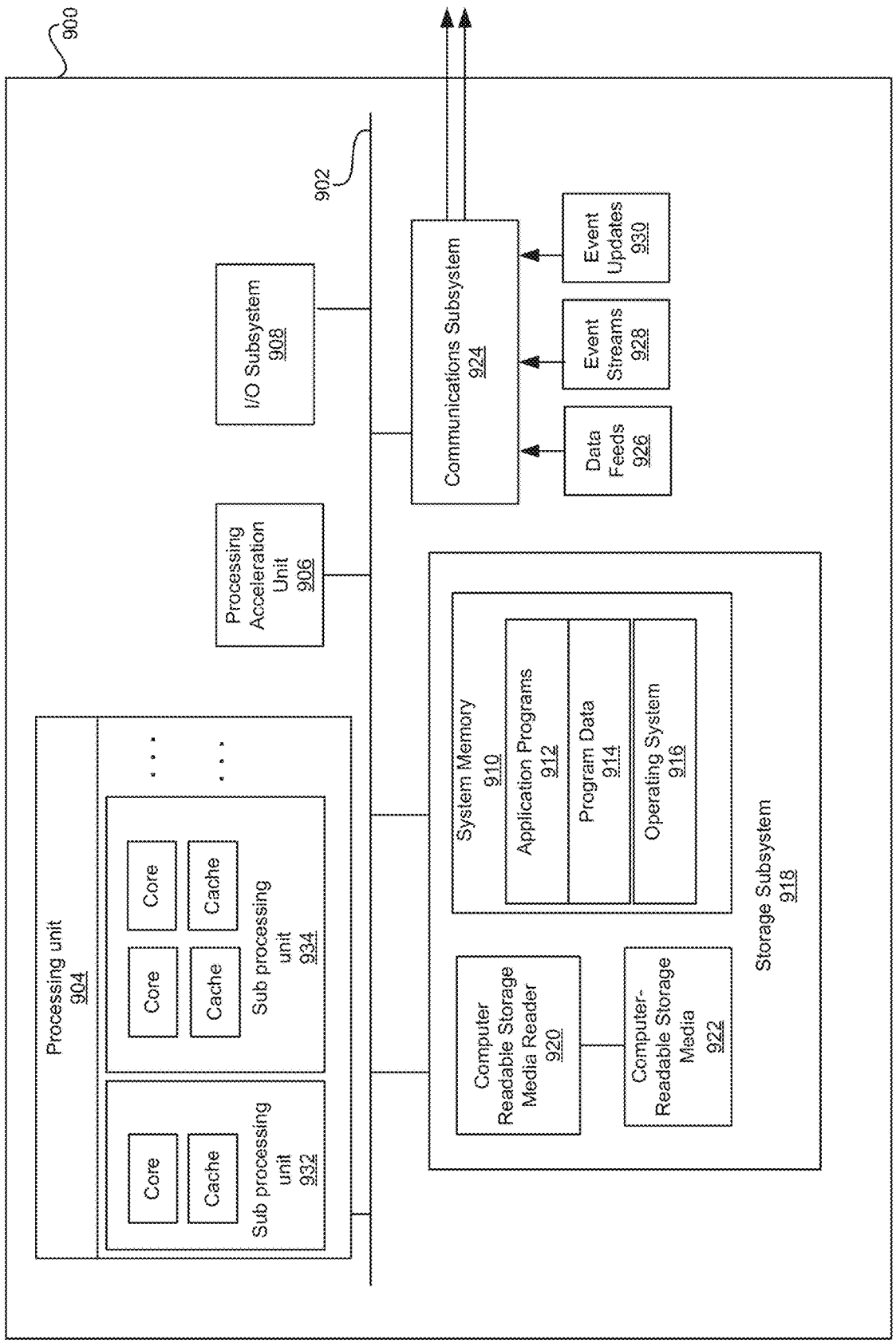
FIG. 9 illustrates an exemplary computer system, in which various embodiments of the present invention may be implemented.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
accessing a first trained model associated with a first entity, the first trained model having been trained using one or more training data sets, each training data set of the one or more training data sets representing a first set of documents, and the first trained model including N dimensions in a first vector space;
accessing a second trained model associated with a second entity, the second trained model having been trained a second set of documents, and the second trained model including the N dimensions in a second vector space;
determining a set of overlapping words between the first trained model and the second trained model;
generating a rotation model using each of the first trained model and the second trained model, the rotation model being configured to transform the second trained model, such that the N dimensions in the second vector space are aligned with the N dimensions in the first vector space;
transforming the second trained model using the rotation model, the transformed second trained model representing the N dimensions of the second trained model in the first vector space; and
updating the first trained model using the transformed second trained model.

2. The computer-implemented method of claim 1, wherein generating the rotation model further comprises:
generating a transpose of the first trained model;
determining a product of the transpose of the first trained model and the second trained model;
inputting the product into a third trained model; and
generating an output in response to inputting the product into the third trained model, the output corresponding to the rotation model.

3. The computer-implemented method of claim 2, wherein updating the first trained model further comprises:
transforming the second trained model by multiplying the rotation model with the second trained model, wherein transforming the second trained model realigns the N dimensions of the second trained model from the second vector space to the first vector space; and
for each word of the set of overlapping words:
combining a first value of each dimension of the N dimensions of the first trained model with a second value of the corresponding dimension of the N dimensions of the second trained model; and
updating the first value with the combined first value and second value.

4. The computer-implemented method of claim 2, wherein the first trained model is generated by inputting the first set of documents into a document-to-vector model, wherein the second trained model is generated by inputting the second set of documents into the document-to-vector model, and wherein the third trained model is a singular value decomposition (SVD) model.

5. The computer-implemented method of claim 1, wherein each of the first trained model and the second trained model includes one or more N-dimensional word vectors.

6. The computer-implemented method of claim 1, wherein the first trained model is updated with the second set of documents associated with the second entity without needing to retrain the first trained model.

7. The computer-implemented method of claim 1, further comprising:
inputting a particular resume into a document-to-vector model;
generating a vector representation of the particular resume;
inputting the vector representation of the particular resume into the updated first trained model; and generating one or more outputs of the updated first trained model, wherein each output of the one or more outputs is used to determine a recommendation of whether or not to hire a candidate associated with the particular resume.

8. A system, comprising:
one or more processors; and
a non-transitory computer-readable storage medium containing instructions which, when executed on the one or more processors, cause the one or more processors to perform operations including:
accessing a first trained model associated with a first entity, the first trained model having been trained using one or more training data sets, each training data set of the one or more training data sets representing a first set of documents, and the first trained model including N dimensions in a first vector space;
accessing a second trained model associated with a second entity, the second trained model having been trained a second set of documents, and the second trained model including the N dimensions in a second vector space;
determining a set of overlapping words between the first trained model and the second trained model;
generating a rotation model using each of the first trained model and the second trained model, the rotation model being configured to transform the second trained model, such that the N dimensions in the second vector space are aligned with the N dimensions in the first vector space;
transforming the second trained model using the rotation model, the transformed second trained model representing the N dimensions of the second trained model in the first vector space; and
updating the first trained model using the transformed second trained model.

9. The system of claim 8, wherein the operation of generating the rotation model further comprises:
generating a transpose of the first trained model;
determining a product of the transpose of the first trained model and the second trained model;
inputting the product into a third trained model; and
generating an output in response to inputting the product into the third trained model, the output corresponding to the rotation model.

10. The system of claim 9, wherein the operation of updating the first trained model further comprises:
transforming the second trained model by multiplying the rotation model with the second trained model, wherein transforming the second trained model realigns the N dimensions of the second trained model from the second vector space to the first vector space; and
for each word of the set of overlapping words:
combining a first value of each dimension of the N dimensions of the first trained model with a second value of the corresponding dimension of the N dimensions of the second trained model; and
updating the first value with the combined first value and second value.

11. The system of claim 9, wherein the first trained model is generated by inputting the first set of documents into a document-to-vector model, wherein the second trained model is generated by inputting the second set of documents into the document-to-vector model, and wherein the third trained model is a singular value decomposition (SVD) model.

12. The system of claim 8, wherein each of the first trained model and the second trained model includes one or more N-dimensional word vectors.

13. The system of claim 8, wherein the first trained model is updated with the second set of documents associated with the second entity without needing to retrain the first trained model.

14. The system of claim 8, wherein the operations further comprise:
inputting a particular resume into a document-to-vector model;
generating a vector representation of the particular resume;
inputting the vector representation of the particular resume into the updated first trained model; and
generating one or more outputs of the updated first trained model, wherein each output of the one or more outputs is used to determine a recommendation of whether or not to hire a candidate associated with the particular resume.

15. A computer-program product tangibly embodied in a non-transitory machine-readable storage medium, including instructions configured to cause a processor to perform operations including:
accessing a first trained model associated with a first entity, the first trained model having been trained using one or more training data sets, each training data set of the one or more training data sets representing a first set of documents, and the first trained model including N dimensions in a first vector space;
accessing a second trained model associated with a second entity, the second trained model having been trained a second set of documents, and the second trained model including the N dimensions in a second vector space;
determining a set of overlapping words between the first trained model and the second trained model;
generating a rotation model using each of the first trained model and the second trained model, the rotation model being configured to transform the second trained model, such that the N dimensions in the second vector space are aligned with the N dimensions in the first vector space;
transforming the second trained model using the rotation model, the transformed second trained model representing the N dimensions of the second trained model in the first vector space; and
updating the first trained model using the transformed second trained model.

16. The non-transitory machine-readable storage medium of claim 15, wherein the operation of generating the rotation model further comprises:
generating a transpose of the first trained model;
determining a product of the transpose of the first trained model and the second trained model;
inputting the product into a third trained model; and
generating an output in response to inputting the product into the third trained model, the output corresponding to the rotation model.

17. The non-transitory machine-readable storage medium of claim 16, wherein the operation of updating the first trained model further comprises:
transforming the second trained model by multiplying the rotation model with the second trained model, wherein transforming the second trained model realigns the N dimensions of the second trained model from the second vector space to the first vector space; and for each word of the set of overlapping words:
combining a first value of each dimension of the N dimensions of the first trained model with a second value of the corresponding dimension of the N dimensions of the second trained model; and
updating the first value with the combined first value and second value.

18. The non-transitory machine-readable storage medium of claim 16, wherein the first trained model is generated by inputting the first set of documents into a document-to-vector model, wherein the second trained model is generated by inputting the second set of documents into the document-to-vector model, and wherein the third trained model is a singular value decomposition (SVD) model.

19. The non-transitory machine-readable storage medium of claim 15, wherein the first trained model is updated with the second set of documents associated with the second entity without needing to retrain the first trained model.

20. The non-transitory machine-readable storage medium of claim 15, wherein the operations further comprise:
inputting a particular resume into a document-to-vector model;
generating a vector representation of the particular resume;
inputting the vector representation of the particular resume into the updated first trained model; and
generating one or more outputs of the updated first trained model, wherein each output of the one or more outputs is used to determine a recommendation of whether or not to hire a candidate associated with the particular resume.

* * * * *